F. W. KREMER.
MULTIPLE SERPENTINE TREAD TIRE.
APPLICATION FILED NOV. 23, 1914.

1,201,744.

Patented Oct. 17, 1916.

Witnesses:
Wm. F. Nickel
F. Birnbach

Franklin W. Kremer, Inventor
By Attorneys
W. H. C. Clarke

UNITED STATES PATENT OFFICE.

FRANKLIN W. KREMER, OF CARLSTADT, NEW JERSEY.

MULTIPLE-SERPENTINE-TREAD TIRE.

1,201,744.

Specification of Letters Patent. Patented Oct. 17, 1916.

Application filed November 23, 1914. Serial No. 873,461.

*To all whom it may concern:*

Be it known that I, FRANKLIN W. KREMER, a citizen of the United States, residing at 32 Central avenue, Carlstadt, New Jersey, have invented a certain new and useful Improvement in Multiple-Serpentine-Tread Tires, of which the following is a specification.

My invention relates to an improvement in tires; and particularly to pneumatic tires intended for use on automobiles and other motor vehicles.

The primary object of my invention is to provide a tire having its tread constructed so that it will not only prevent skidding, but will also be adapted to compress or flatten evenly and uniformly when the successive portions thereof come into contact with the ground; whereby undue thickening or bulging of the tire in any part is prevented.

The above and other objects and advantages of my invention will appear from the following specification taken in connection with the accompanying drawings which illustrate a preferred form of my invention.

Figure 1:
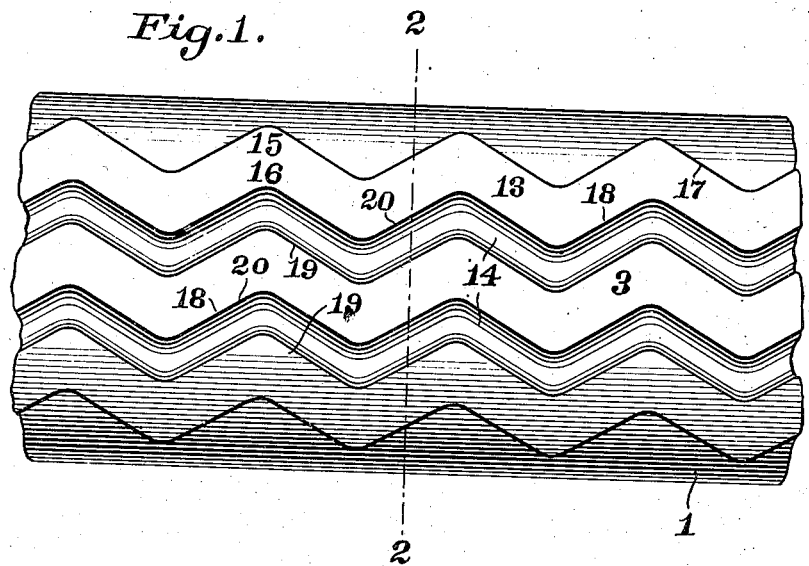
Figure 2:
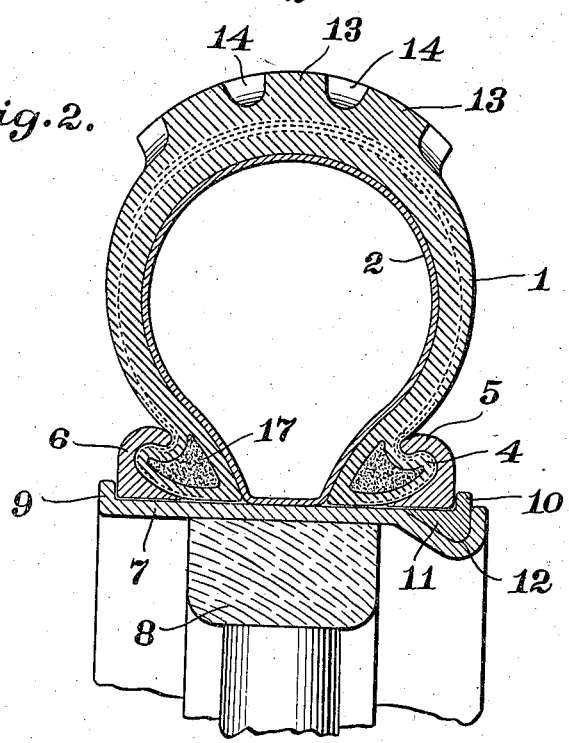

On said drawings Figure 1 is a plan of a portion of my improved tire and Fig. 2 is a section on line 2—2 of Fig. 1.

In the particular description of the drawings, I employ the same numerals to indicate the same parts throughout the several views.

My improved tire comprises the usual outer casing 1, inclosing an inner inflatable tube or casing 2 and having its outer face thickened to form a tread 3. The inner edges of the casing 1 are formed to provide rounded flanges 4 and grooves 5, adapted to be engaged by rings 6, to secure the tire to the circumference of a wheel. These rings have their outer edges inturned to enter the grooves 5 and are formed so that their inner faces correspond in shape to the flanges 4 and form a snug fit over the same. The rings 6 are mounted upon a band 7, carried on the rim of a wheel 8, and having along one edge a flange 9 which holds one of the rings 6; the other ring being engaged and held by means of the flange 10 of a key 11 which fits into a groove 12 in the band 7. It is immaterial how the tire is secured to the wheel, as there are numerous constructions for this purpose; and the device shown in Fig. 2 for holding the tire and the wheel together are intended as illustrative only, and form no part of my invention.

The utility and value of my improvement resides particularly in the construction of tread 3, which includes a number of ribs 13 spaced from each other and extending entirely around the casing 1. These ribs do not follow a straight line, but are serpentine in shape; that is, they extend around the casing in zig-zag fashion. I may use as many of these ribs as necessary or preferable, but I show three in the drawings, and they are separated by the grooves 14. The grooves 14 are preferably of uniform width and are parallel to each other; and the edges of the ribs 13, which are substantially flat, and likewise of preferably uniform width, are also parallel to the edges of the grooves 14. Each of the ribs 13 thus comprises a number of projections 15 and a number of recesses 16; and it also comprises sections or portions 17 extending across the tire transversely or diagonally in one direction, alternating with sections or portions 18, extending diagonally or transversely across the tire in the opposite direction. Each of the zig-zag sections or portions of the ribs strengthens and reinforces the adjacent sections; thus enabling the ribs to bear the load advantageously when it comes upon the successive portions or sections thereof; and the projections 15 act as buttresses to prevent curling or warping of the ribs; while the recesses 16 provide room for the expansion or flattening of the ribs when the weight of the load presses upon them.

This construction of tread also prevents any tendency of the vehicle to sway from side to side, because the edges of the ribs extend diagonally in opposite directions. If one supposes that the portion of the tire shown in Fig. 1 is in contact with the ground, and is moving to the right, it will be plain that the edge 19 of any section 17 of the middle rib 13 will tend to move or sway the wheel in one direction; while the edge 20 of the adjacent section 18 will tend to move the wheel in the opposite direction. The same effect will be produced by the edges of the outer ribs 13; and as a result, lateral thrust on the wheel will be eliminated. Hence the full benefit of the antiskidding effect due to the serpentine contour of the ribs 13 is attained without deflection of the wheel; in other words, the ribs 13 constitute a tread comprising a number of continuous projections, formed to prevent slipping as well as to afford other advantages which it is the object of my invention to secure.

Further, by means of a tread constructed of serpentine ribs as above set forth, it will be clear that as each successive portion of the tire comes into contact with the ground, the flattening or expanding effect on the tread, due to the weight of the load, will be evenly distributed over the entire width of the tread 3. If the tread 3 were not made up of ribs separated by grooves, the load would not be uniformly distributed, but would compress the rubber or other material of which the tire is made to the greatest extent in the middle. The effect of this would be to cause bulging of the tire along the sides thereof, as each portion comes into contact with the ground; and the casing 1 would soon become greatly weakened. With my improved tread, no such bulging on the sides of that part of the casing 1 which is in contact with the ground, is produced, and this result is due to the fact that the different ribs 13 are compressed independently of one another, and the material of which they are made, spreads out laterally in such a way as to tend to squeeze the sides of the grooves 14 together. The flattening or expanding of the face of the tread is therefore uniformly distributed over the entire width of the tread; and I not only attain greater efficiency in operation, but I am also able to make the tread last longer in practice.

Another important advantage due to the serpentine shape of the ribs 13 is the confining of the distorting effect of the load on the tread to that part of the tread which bears it. If the ribs were straight, this effect at each point touching the ground would be cumulative, extending along the tread, and producing thickening and bulging across the tread directly in front of and behind the part of the tread carrying the weight of the vehicle to which the wheel is attached. But with the serpentine ribs, when any diagonal section is flattened out, that section expands not only across, but lengthwise also; and in both directions along its length. Hence the expansion of each diagonal section meets and opposes at its ends the expansion of the two adjacent sections, and the expanding and flattening of the tread is thus localized. As a result, the ribs spread sidewise mostly, into the grooves 14, and no bulging can take place across the tread, either as the tread touches the ground or as it leaves the same.

Of course, the flanges 4 may be hollow, if desired, and filled with any suitable stiffening cement or other substance indicated at 17, for the embedding of reinforcing wires, as may be readily understood. Likewise, the serpentine ribs may be applied to a solid rubber tire, if desired.

I do not of course, wish to be restricted to the exact details of construction herein described, but on the contrary, I desire to reserve the right to make such changes as come within the scope of the claim appended hereto.

What is claimed as new is:

A multiple serpentine tire shoe comprising a body and a thickened tread consisting of a plurality of parallel continuous, unbroken zig-zag ribs of uniform cross-section throughout, said ribs being defined and separated by grooves relatively U-shaped in cross-section, whereby to produce steep walls and relatively wide bottoms capable when under pressure of gripping sand and other granular material between the ribs.

In testimony whereof I have signed my name to this specification in the presence of two subscribing witnesses, this 25th day of August, 1914.

FRANKLIN W. KREMER.

Witnesses:
WILLIAM F. NICKEL,
H. BIRNBACH.